United States Patent
Kawai

(10) Patent No.: US 7,425,985 B2
(45) Date of Patent: Sep. 16, 2008

(54) IMAGE PROCESSING APPARATUS AND METHOD

(75) Inventor: Tomoaki Kawai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 584 days.

(21) Appl. No.: 11/210,564

(22) Filed: Aug. 24, 2005

(65) Prior Publication Data

US 2006/0045377 A1 Mar. 2, 2006

(30) Foreign Application Priority Data

Aug. 27, 2004 (JP) .............................. 2004-249016

(51) Int. Cl.
*G06K 9/40* (2006.01)
*H04N 5/217* (2006.01)
*H04N 5/00* (2006.01)
*H04N 5/228* (2006.01)
*H04N 5/21* (2006.01)
*H04N 5/225* (2006.01)

(52) U.S. Cl. .................. 348/207.11; 348/241; 348/606; 348/222.1; 348/627; 382/274

(58) Field of Classification Search ................ 348/241, 348/627, 606, 222.1; 382/274
See application file for complete search history.

(56) References Cited

U.S. PATENT DOCUMENTS

| | | | |
|---|---|---|---|
| 5,953,461 A * | 9/1999 | Yamada ...................... 382/266 |
| 6,055,340 A * | 4/2000 | Nagao ......................... 382/261 |
| 6,480,300 B1 * | 11/2002 | Aoyama ...................... 358/1.9 |
| 6,628,842 B1 * | 9/2003 | Nagao ......................... 382/266 |
| 7,068,328 B1 * | 6/2006 | Mino .......................... 348/672 |
| 7,271,851 B2 * | 9/2007 | Lin et al. ..................... 348/631 |
| 7,310,450 B2 * | 12/2007 | Steinberg et al. ............ 382/275 |

FOREIGN PATENT DOCUMENTS

JP  10-040185  2/1998

OTHER PUBLICATIONS

Jobson, et al., "A Multiscale Retinex for Bridging the Gap Between Color Images and the Human Observation of Scenes" (IEEE Transactions on Image Processing, vol. 6, No. 7, Jul. 1997).
Richard, et al., "Photographic Tone Reproduction for Digital Images" (acm Transactions on Graphics, Jul. 2002, vol. 21, No. 3).

* cited by examiner

*Primary Examiner*—Nhan T. Tran
*Assistant Examiner*—Pritham Prabhakher
(74) *Attorney, Agent, or Firm*—Cowan, Liebowitz & Latman, P.C.

(57) ABSTRACT

A dodging process which brightens a dark portion sometimes makes noise components contained in an image obtained by an image sensor conspicuous. A gray image generator extracts a luminance component Y of an image, an unsharp image generator generates an unsharp image L on the basis of the luminance component Y, a correction coefficient calculator calculates a correction coefficient g for correcting a brightness difference of the image in accordance with the unsharp image L, a corrector performs a dodging process in accordance with the correction coefficient g, and a noise eliminator eliminates noise of the image in accordance with the correction coefficient g.

13 Claims, 10 Drawing Sheets

IMAGE PROCESSING APPARATUS AND METHOD

FIELD OF THE INVENTION

The present invention relates to an image processing apparatus and method and, more particularly, to image processing which corrects a brightness difference of an image.

BACKGROUND OF THE INVENTION

A camera having a wide dynamic range, i.e., a so-called wide dynamic range camera capable of clearly sensing motion images of both a very bright object and dark object in the same angle of view is attracting attention.

On the other hand, the field of still images also has a technique which corrects an object having a brightness difference, particularly, a backlighted object by digital image processing corresponding to a dodging process performed in a darkroom for silver-salt films. For example, Jobson et al., "A Multiscale Retinex for Bridging the Gap Between Color Images and the Human Observation of Scenes" (IEEE TRANSACTIONS on IMAGE PROCESSING, VOL. 6, NO. 7, JULY 1997) is a method which improves a digital image by performing differential processing between a logarithmically converted component of the image and a low-frequency component of this logarithmically converted component, thereby darkening a bright component in a low-frequency region of the image, and brightening a dark component in the low-frequency region.

Also, Richard et al., "Photographic Tone Reproduction for Digital Images" (acm Transactions on Graphics, JULY 2002, Vol. 21, No. 3) proposes a method which obtains an effect similar to dodging in digital image processing by using a luminance component and low-frequency component of a digital image.

Furthermore, a so-called network camera by which a camera is connected to a network and an image in a remote place is viewed by using a dedicated or general-purpose viewer is recently attracting attention (Japanese Patent Laid-Open No. 10-040185). When the dodging process is applied to this network camera, the same effect as the wide dynamic range camera can be given to the network camera.

Since, however, the dodging process for still images is a process which brightens a dark portion, noise components contained in an image obtained by an image sensor using a charged-coupled device (CCD) or the like sometimes become conspicuous. The larger the amount of correction which brightens a dark portion, the more conspicuous the noise components buried in the dark portion of the image. Accordingly, if the dodging process is applied to motion images sensed by a motion image camera such as a monitor camera or network camera, temporal fluctuations are further added to noise which is already made conspicuous by dodging, thereby producing noise which flickers frame by frame. As a consequence, the noise is observed as very conspicuous random noise.

If the performance of the image sensor improves in the future to eliminate most noise, the problem as described above may be solved. At present, however, the dodging process often makes the existing buried latent noise conspicuous.

SUMMARY OF THE INVENTION

The first aspect of the present invention is to extract a luminance component of an image, generate an unsharp image of the luminance component, correct the image using a correction amount in accordance with the unsharp image, and eliminate noise of the corrected image in accordance with the correction amount.

Also, the second aspect of the present invention is to perform correction on the basis of a luminance component of an image, perform a noise elimination process for the corrected image, and, on the basis of an unsharp image generated on the basis of the luminance component of the image, control the conditions of the correction and the conditions of the noise elimination process.

The present invention can generate a clear image from an image having a large brightness difference by correcting the brightness difference and reducing the noise of the image.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Image processing of embodiments according to the present invention will be described in detail below with reference to the accompanying drawings.

First Embodiment

[Outline]

In the first embodiment, a motion image camera such as a monitor camera or network camera incorporating, in image processing, a dodging process which includes a noise reduction process will be explained.

Although details will be described later, this dodging process including the noise reduction process makes it possible to obtain a clear motion image from an image having a large luminance difference (brightness difference) between bright and dark portions in a frame, by reducing the brightness difference while reducing the noise of the image. Since noise elimination is performed in accordance with the correction amount of the brightness difference, only an image portion requiring noise elimination is filtered. In an image portion requiring no noise elimination, therefore, it is possible to avoid image quality deterioration (e.g., an unsharpened edge of an object image) caused by the noise reduction process. It is, of course, also possible to reduce the load on an image processor of the camera by reducing the noise of only a necessary image portion.

As described above, a motion image camera having the same effect as the wide dynamic range camera can be obtained by performing the dodging process including the noise reduction process for a motion image in the image processor of the camera.

[System Configuration]

Figure 1:
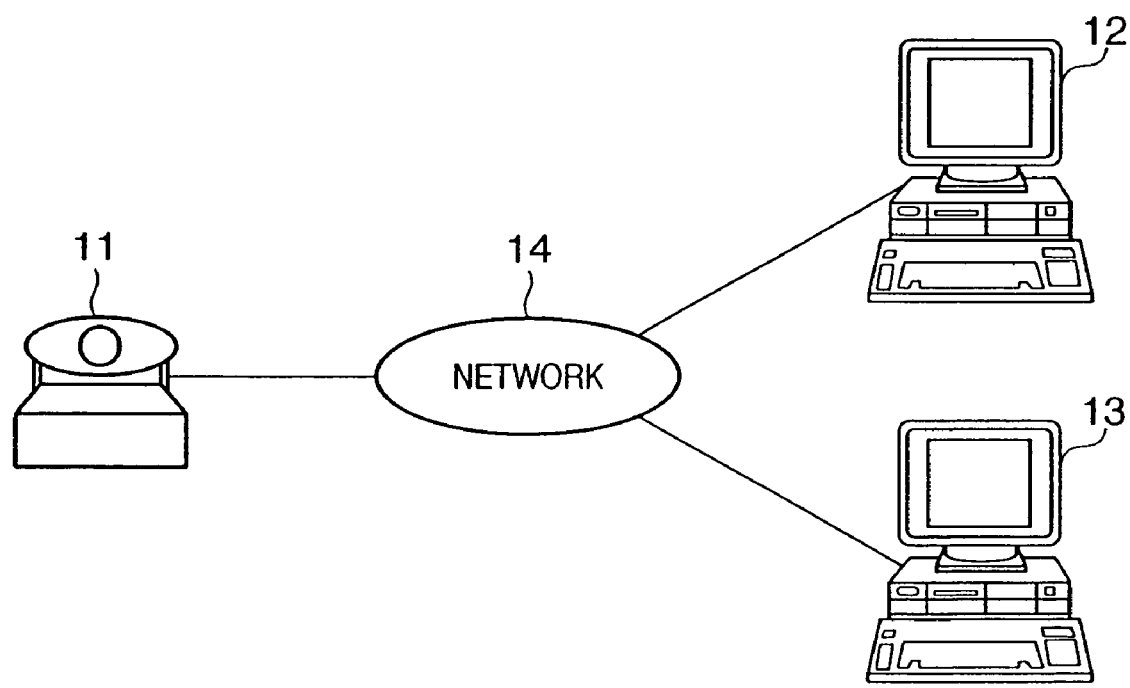
FIG. 1 is a block diagram showing the configuration of a network camera system to which a camera of the first embodiment is connected.

FIG. 1 is a block diagram showing the configuration of a network camera system to which the camera of the first embodiment is connected.

A camera 11 is connected to terminal apparatuses 12 and 13 across a network 14 such as the Internet or a local area network (LAN). In accordance with a request from the terminal apparatus 12 or 13, the camera 11 distributes a sensed image to the terminal apparatus 12 or 13 (or a designated network address) across the network 14. The terminal apparatus 12 or 13 displays the image distributed from the camera 11 on a monitor, thereby reproducing the image sensed by the camera 11 in substantially real time. Also, the terminal apparatus 12 or 13 can perform camera control, e.g., panning, tilting, and zooming by sending a camera control request to the camera 11 across the network 14.

A plurality of terminal apparatuses (in addition to the two shown in FIG. 1) can be connected to the camera 11 across the network 14, and can simultaneously access the camera 11 and receive the distribution of images. If a plurality of terminal apparatuses are connected, the camera 11 accepts a camera control request from a specific terminal apparatus. Alternatively, the camera 11 does not accept camera control requests from a plurality of terminal apparatuses at the same time, but accepts a camera control request issued first by one of these terminal apparatuses, and, during a period in which camera control from this terminal apparatus continues, does not accept any camera control requests from the other terminal apparatuses. When the continuous camera control from one terminal apparatus stops and a predetermined time elapses, the camera 11 accepts a camera control request issued first by one of the terminal apparatuses again.

Also, not a single camera but a plurality of cameras constituting this embodiment can be connected to the network 14. In a network camera system in which a plurality of cameras and a plurality of terminal apparatuses are connected across the network 14, combinations of cameras and terminal apparatuses (e.g., a combination of a camera which distributes an image and a terminal apparatus which receives the distribution, and a combination of a camera and a terminal apparatus which controls the camera) can be freely set by designating network addresses.

The network 14 is not particularly limited as long as it is a digital network having an enough band to pass compressed image data (to be described later) and camera control data. In the following explanation, the network 14 is a network capable of transmitting TCP/IP (Transfer Control Protocol/Internet Protocol) packets, and IP addresses are used as network addresses. Therefore, the camera, the terminal apparatuses, and an image recorder (to be described later) are assigned different IP addresses.

Figure 2:
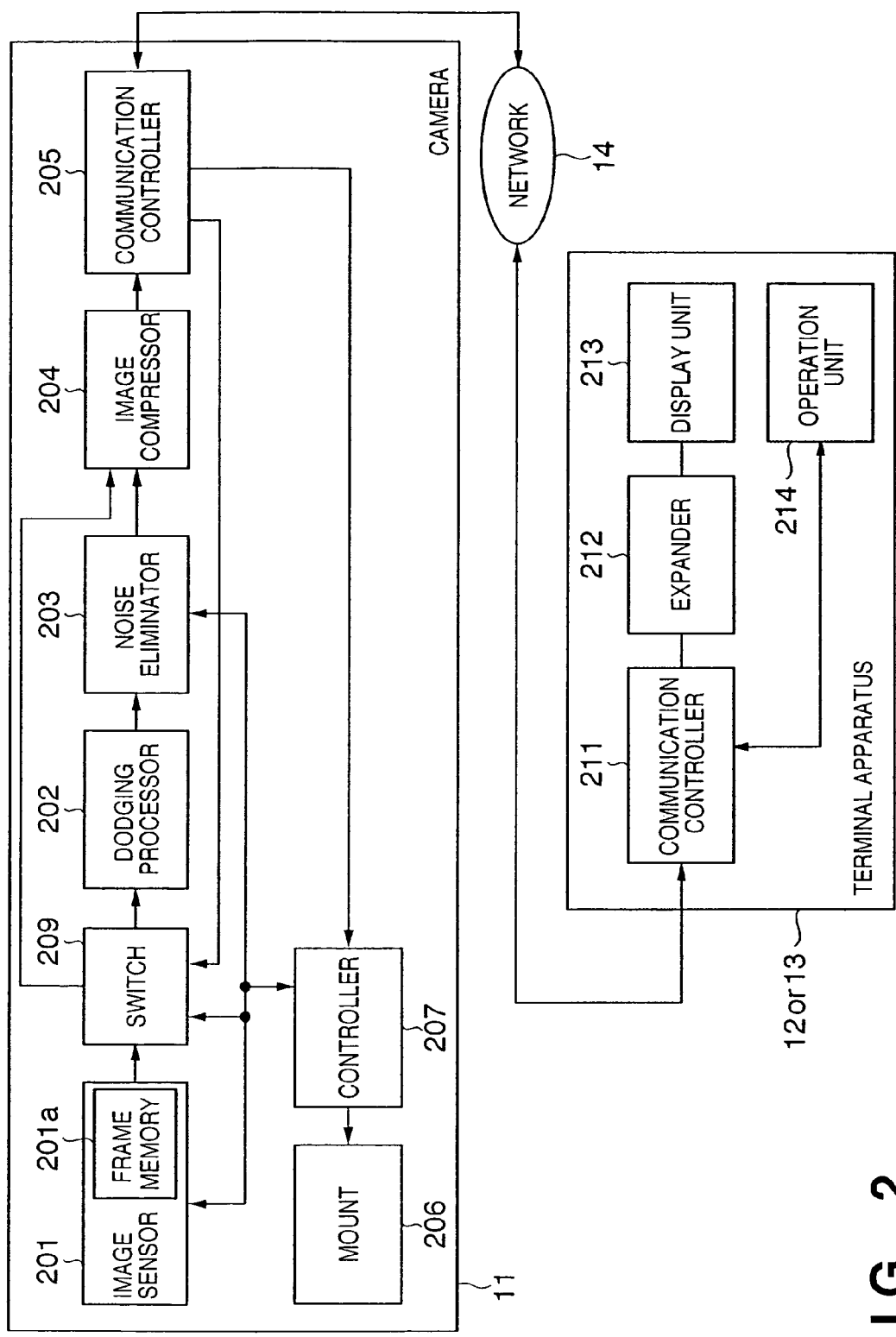
FIG. 2 is a block diagram showing details of the arrangements of the camera and a terminal apparatus.

FIG. 2 is a block diagram showing details of the arrangements of the camera 11 and terminal apparatus 12 (or 13).

In the camera 11, an image sensor 201 has a lens, iris, CCD, automatic exposure (AE) controller, frame memory 201a, and the like, and outputs a sensed image as a digital image signal. A dodging processor 202 performs image processing equivalent to a dodging process on the image signal. A noise eliminator 203 performs a noise reduction process on the dodged image signal. If the dodging process and noise reduction process are unnecessary, a switch 209 allows the image signal to bypass the dodging processor 202 and noise eliminator 203.

An image compressor 204 compresses the data of the image signal by a lossy compression scheme such as JPEG (Joint Photographic Image Coding Experts Group), MPEG (Moving Picture Image Coding Experts Group), or H.264. A communication controller 205 interfaces with the network 14, and distributes the compressed image signal to the terminal apparatus 12, or receives a camera control request from the terminal apparatus 12.

A controller 207 controls the switch 209, and, on the basis of a camera control request received from the communication controller 205, controls a mount 206 to adjust the pan and tilt angles of the image sensor 201, and controls the lens of the image sensor 201 to adjust the zoom magnification.

A communication controller 211 of the terminal apparatus 12 (or 13) receives an image signal distributed across the network 14. An expander 212 expands the received image signal where necessary, and a display unit 213 displays the expanded image on a monitor. An operation unit 214 controls the communication controller 211 to receive an image distributed from a camera designated by the user.

Note that the reception, expansion, and display of images distributed across the network 14 are normally realized by executing a dedicated or general-purpose viewer program by a CPU of the terminal apparatus such as a personal computer.

[Camera Operation]

Figure 3:
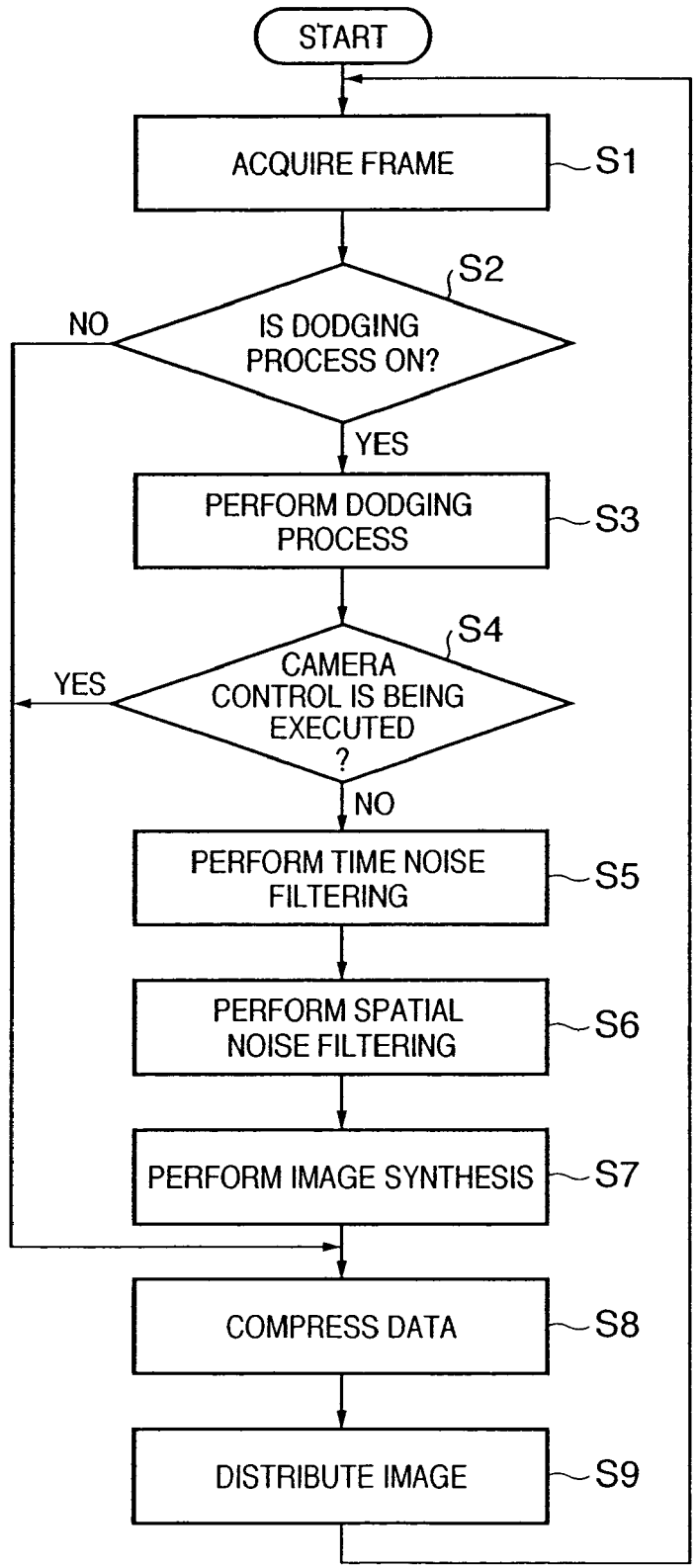
FIG. 3 is a flowchart for explaining the operation of the camera.

FIG. 3 is a flowchart for explaining the operation of the camera 11.

First, the image sensor 201 acquires an image of one frame (S1). In the state in which the switch 209 is closed to a non-bypass side, i.e., the dodging process is ON (S2), the dodging processor 202 executes the dodging process (S3), thereby brightening a dark portion in the frame.

Then, if no camera control is being executed (S4), the frame undergoes noise filtering (S5), spatial noise filtering (S6), and image synthesis (S7) performed by the noise eliminator 203 for a time corresponding to the correction amount of the brightness difference. The image compressor 204 performs, e.g., Motion-JPEG compression (S8), and the communication controller 205 transmits the compressed frame to, e.g., the terminal apparatus 12 requesting the distribution of the frame (S9). The image is distributed to the terminal apparatus by repeating the above processing for each frame.

In the state in which the switch 209 is closed to a bypass side, i.e., the dodging process is OFF (S2), the frame is compressed by Motion-JPEG compression and transmitted by bypassing the dodging processor 202 and noise eliminator 203. Also, if camera control is being executed (S4), noise is inconspicuous when an image is displayed, so the noise eliminator 203 is bypassed.

Note that the image signal compression method is not limited to Motion-JPEG, and a compression form such as MPEG4 or H.264 may also be used. Note also that if the network 14 has a sufficiently wide band or the frame size of frame rate of an image signal is sufficiently small or low, lossless compression can be performed, or no data compression is necessary in some cases.

The dodging process is necessary when a very bright object and dark object exist at the same time, e.g., when an object is backlighted or when an object in the sun and an object in the shade exist in the same angle of view at the same time. Therefore, the dodging process is not always necessary depending on the shooting status of objects. Accordingly, the controller 207 normally keeps the dodging process OFF. However, the controller 207 turns on and off the dodging process by the switch 209 if the terminal apparatus requests the dodging process, or in accordance with the brightness difference in the angle of view, which is detected by the automatic exposure controller in the image sensor 201. In the following explanation, assume that the terminal apparatus designates ON/OFF of the dodging process and a parameter (to be described later) of the dodging process.

The controller 207 may also automatically turn on the dodging process only when the brightness difference in a frame obtained by the image sensor 201 is equal to or larger than a predetermined value.

[Dodging Process]

The basis of the dodging process is a correction process of brightening a generally dark portion (a low-luminance portion) in a frame. Therefore, a correction parameter changes from one portion to another in a frame. However, the correction amount is increased for a generally dark portion, and decreased for a generally bright portion. An unsharp image is used to distinguish between generally bright and dark portions.

Figure 4:
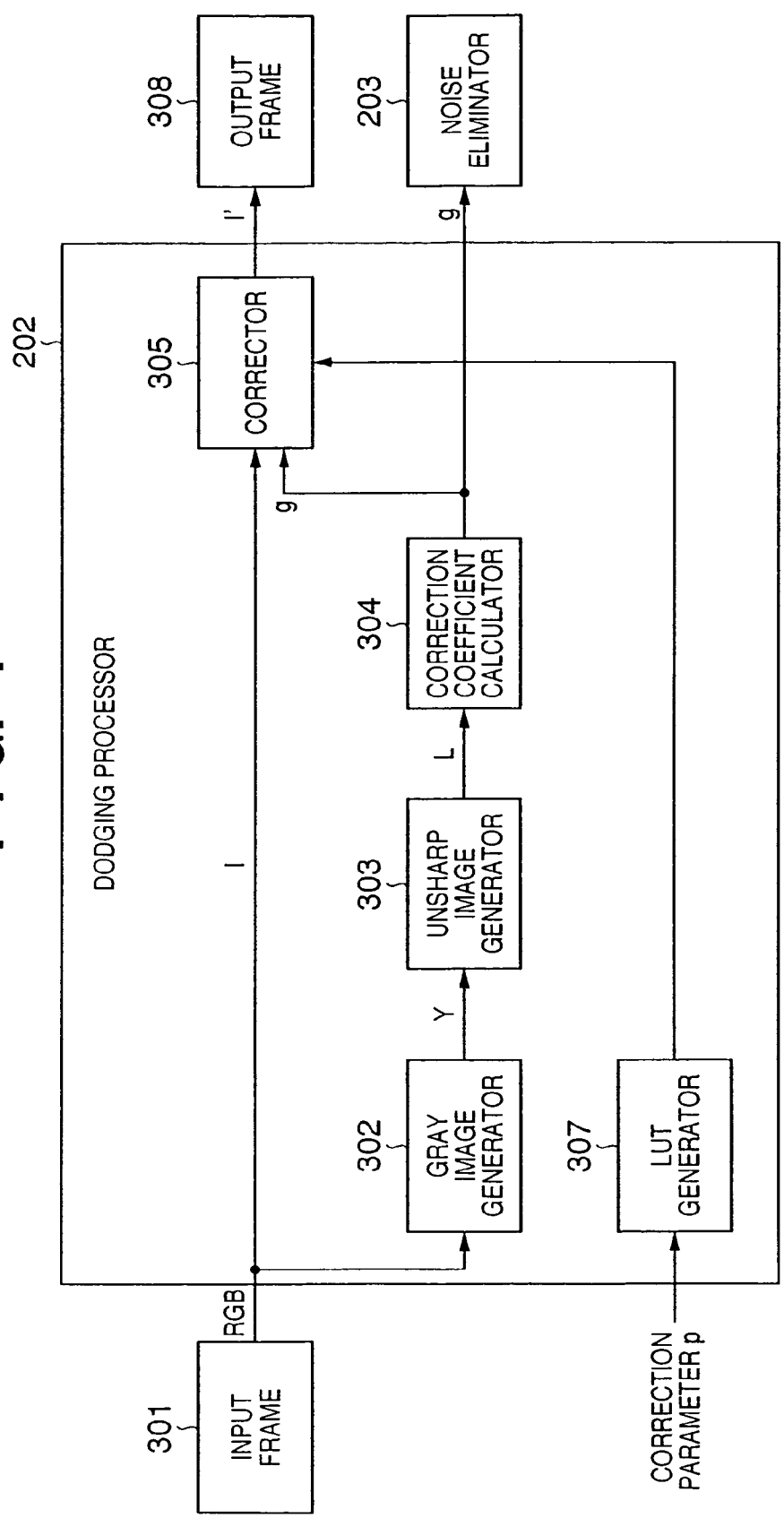
FIG. 4 is a block diagram showing the arrangement of a dodging processor.

FIG. 4 is a block diagram showing the arrangement of the dodging processor 202.

A gray image generator 302 receives an RGB frame 301 output from the image sensor 201 and having 8 bits for each color as a bit depth, and calculates a luminance component Y from the RGB components of the input frame 301, thereby generating a grayscale image. As the method of calculating the luminance component Y, it is possible to use various methods such as a transformation formula from RGB to YCbCr and a transformation formula from RGB to HSV. However, the method is not particularly limited, and it is only necessary to calculate the luminance component Y by any method. In this manner, a grayscale image Y(x,y) as a set of the luminance components Y is generated. Note that (x,y) represents a pixel position, and $1 \leq x \leq N$ and $1 \leq y \leq M$ when the input frame 301 has N×M pixels.

Figure 5:
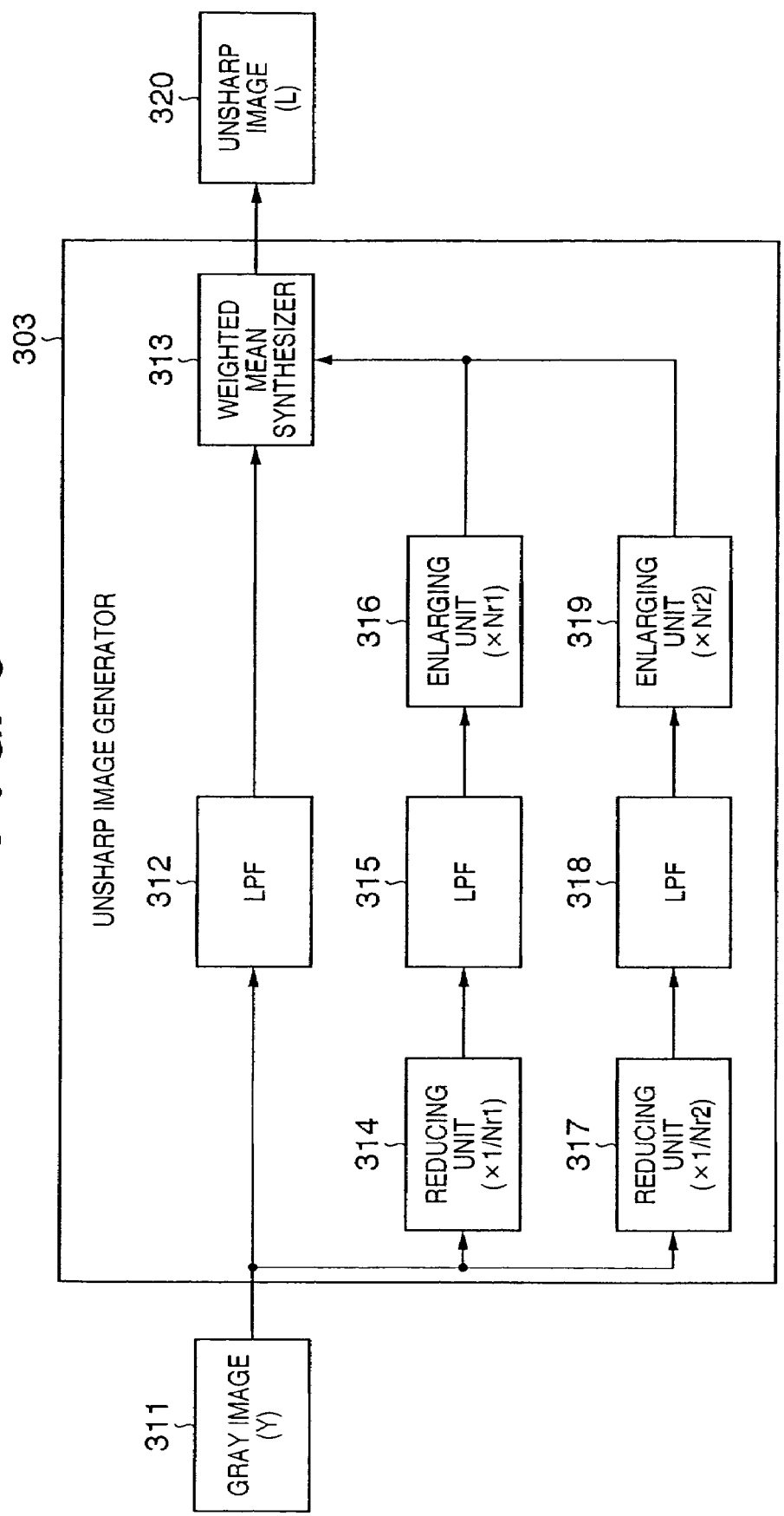
FIG. 5 is a block diagram showing the arrangement of an unsharp image generator.

FIG. 5 is a block diagram showing the arrangement of the unsharp image generator 303.

In the unsharp image generator 303, grayscale images obtained by reducing an input grayscale image Y(x,y) by a reducing unit 314 (reduction ratio=1/Nr1) and reducing unit 317 (reduction ratio=1/Nr2) and an unreduced grayscale image are filtered by low-pass filters (LFPs) 312, 315, and 318 such as Gaussian filters. Then, reduced/enlarged images obtained by enlarging the reduced images by an enlarging unit 316 (enlargement ratio=Nr1) and enlarging unit 319 (enlargement ratio=Nr2) and an unreduced/unenlarged image are synthesized by a weighted mean synthesizer 313 to obtain an image as the weighted mean of a plurality of low-frequency components. This weighted mean image of the low-frequency components is an unsharp image L(x,y) which is general to a certain degree. Equation (1) below indicates the unsharp image.

$$L(x,y) = \Sigma_n W_n M_n [F_n(x,y) * R_n \{Y(x,y)\}] \quad (1)$$

where n is the number of images having different sizes (n=3 in FIG. 5)

$W_n$ is the weight $M_n$ is the enlargement ratio (1, Nr1, and Nr2 in FIG. 5)

$F_n$ is the characteristic of the low-pass filter $R_n$ is the reduction ratio (1, 1/Nr1, and 1/Nr2 in FIG. 5)

\* indicates a product-sum operation

As the filter size of the low-pass filter, an appropriate size need only be selected for each n indicated by equation (1) in accordance with a desired degree of blur. Note that the unsharp image generation method is not limited to the above method, and it is only necessary to generate a general grayscale image indicating brightness and darkness, which can be used as a dodging mask. Note also that the unsharp image L(x,y) has the same size (N×M pixels) and the same bit depth (8 bits) as the input frame 301.

A correction coefficient calculator 304 receives the unsharp image L(x,y) and calculates a correction coefficient g(x,y) in accordance with equation (2) below. Note that the darker a portion (the lower the luminance of a portion), the smaller the value of L, and the larger the correction coefficient g.

$$g(x,y) = 1/L(x,y) \quad (2)$$

A corrector 305 performs correction by multiplying each color component of the input frame 301 by the correction coefficient g and by the power of a correction parameter, as indicated by $$Ir'(x,y) = g(x,y) \times Ir(x,y)^{-p}$$

$$Ig'(x,y) = g(x,y) \times Ig(x,y)^{-p}$$

$$Ib'(x,y) = g(x,y) \times Ib(x,y)^{-p} \quad (3)$$

where Ir(x,y), Ig(x,y), and Ib(x,y) are the RGB components of each pixel of the input frame 301

Ir'(x,y), Ig'(x,y), and Ib'(x,y) are the RGB components of each pixel of an output frame 308 p is a correction parameter which determines the strength of the correction amount ($p \geq 1.0$)

Figure 6:
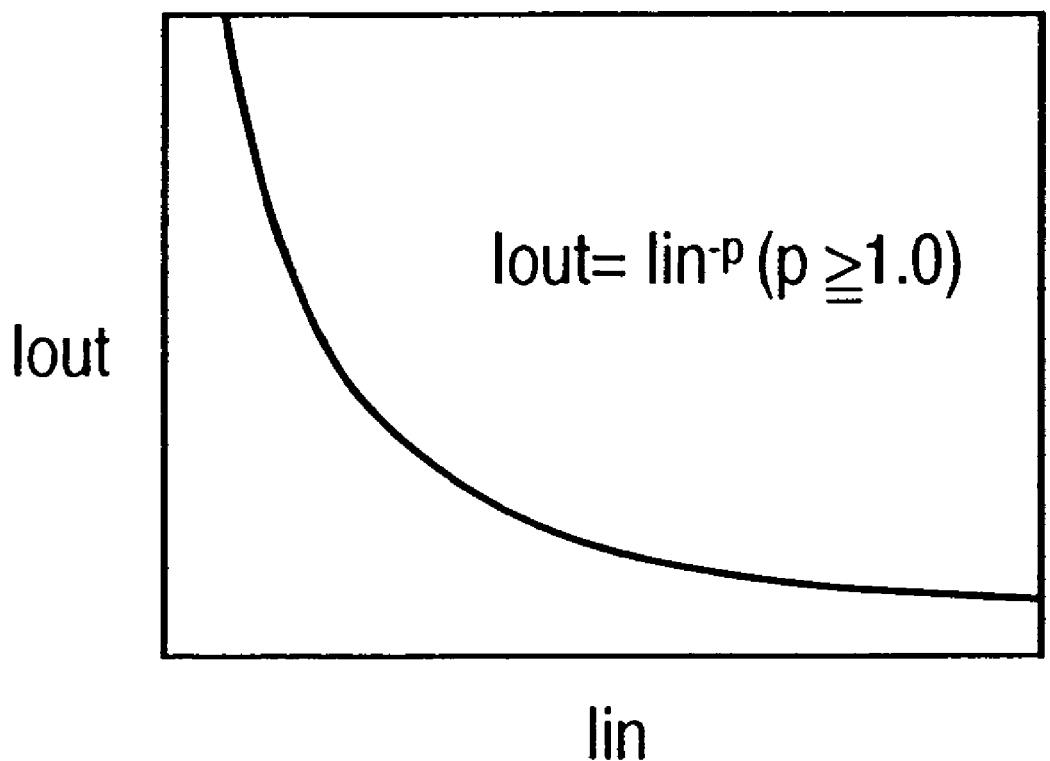
FIG. 6 is a graph for explaining a lookup table generated by an LUT generator.

As indicated by equation (3), the larger the correction parameter p, the larger the correction amount. To increase the speed of the operation of equation (3), when the correction parameter p is given, an LUT generator 307 generates a lookup table (LUT) having a conversion characteristic as shown in FIG. 6, and sets the generated table in the corrector 305. Note that the LUT shown in FIG. 6 receives 16-bit data Iin which is obtained by combining the color component Ir, Ig, or Ib (8 bits) of each pixel of the input frame 301 and the correction coefficient g (8 bits), and outputs 8-bit data Iout (corresponding to each color component of the output frame 308).

Although the input frame 301 is an RGB frame in the above explanation, it is also possible to use another type of frame such as a YCbCr frame or HSV frame. In this case, referring to a Y (luminance) or V (Brightness) signal makes the gray image generator 302 unnecessary, and the multiplication by the correction coefficient g and the power of the correction parameter p by the corrector 305 is the same as in the case of RGB. Assume that as the correction parameter p, the user of the terminal apparatus designates an appropriate value across the network 14.

[Noise Reduction Process]

Figure 7:
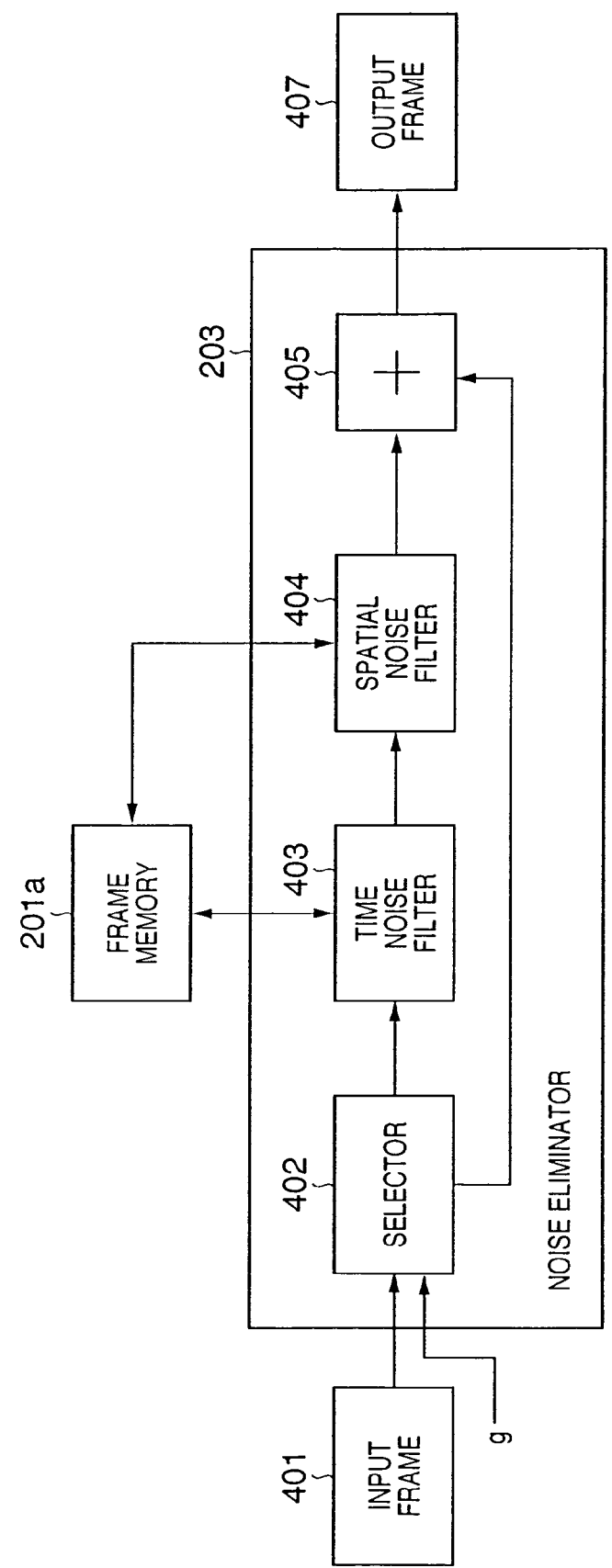
FIG. 7 is a block diagram showing the arrangement of a noise eliminator.
Figure 8:
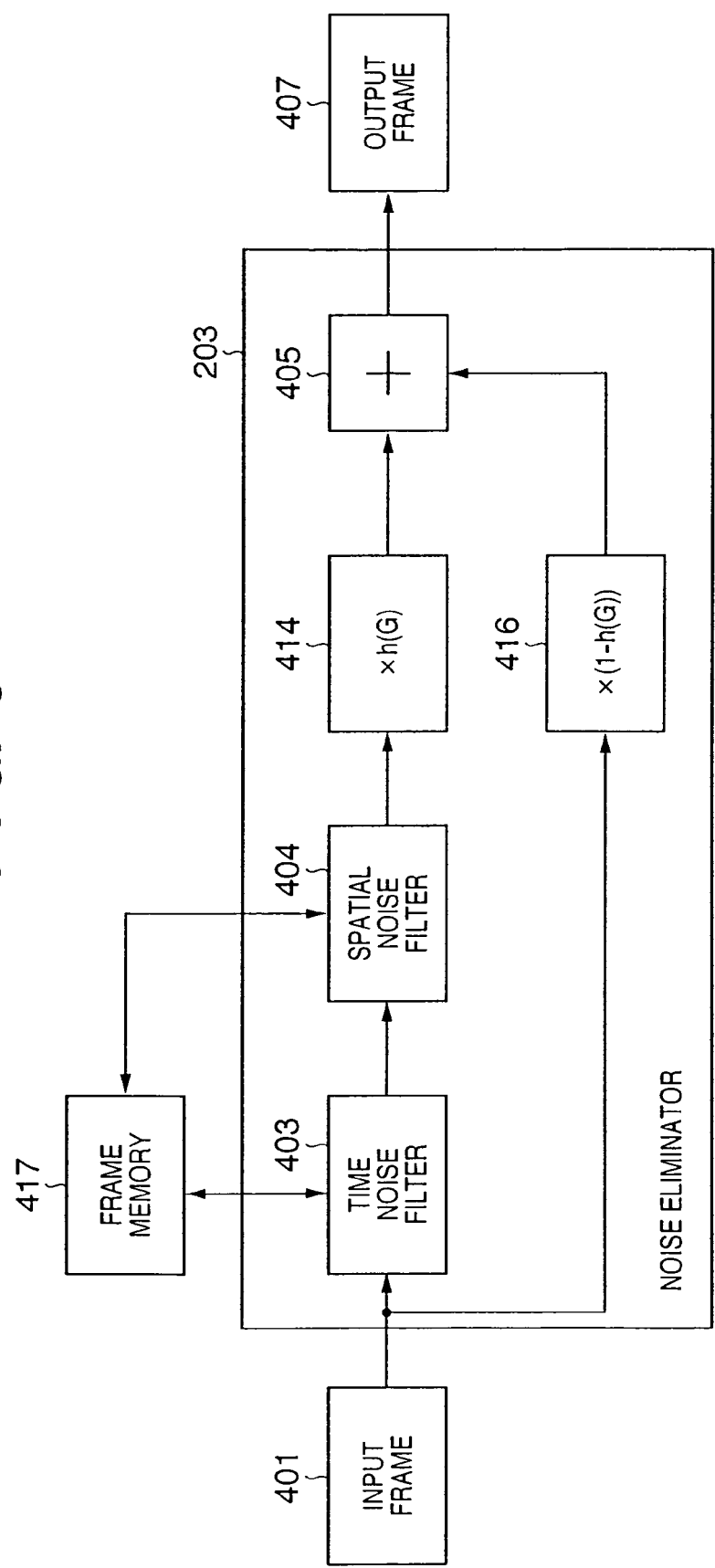
FIG. 8 is a block diagram showing the second example of the noise eliminator.

FIGS. 7 and 8 are block diagrams showing the arrangements of the noise eliminator 203. Although these two arrangements will be explained below, each arrangement determines the degree (contribution) of a filtering process for each pixel in accordance with the correction coefficient g(x,y) input from the dodging processor 202. First, a simple arrangement shown in FIG. 7 will be described below.

A selector 402 compares the correction coefficient g(x,y) with a predetermined threshold value Gth for each pixel. Since a pixel for which g>Gth, i.e., a pixel having a large correction coefficient exists in a noisy image region (dark portion), this pixel is supplied to the filtering process. On the other hand, a pixel for which g≦Gth exists in an unnoisy image region (bright portion), so the filtering process is bypassed. The frame is restored by synthesizing the filtered and unfiltered pixels by a synthesizer 405.

A time noise filter 403 refers to the frame memory 201a of the image sensor 201, and outputs the weighted mean value or median value of pixel values of several frames for each pixel of interest. Equation (4) below indicates an output pixel value I'(t,x,y) when the weighted mean of k frames is calculated.

$$I'(t,x,y) = \sum_{k=0}^{k=k-1} Wk \times I(t-k,x,y) \quad (4)$$

where I(t,x,y) is the value of a pixel of interest in a current frame t

I(t-k,x,y) is the value, stored in the frame memory, of a pixel of interest k frames before the current frame Wk is the weight corresponding to a frame Equation (5) below indicates an output pixel value I'(t,x,y) when the median value of k frames is calculated.

$$I'(t,x,y) = \text{Med}[I(t,x,y), I(t-1,x,y), \ldots,$$

$$I(t-k-1,x,y)] \quad (5)$$

where Med[ ] is an operation of calculating the median value when arguments are arranged in ascending order A spatial noise filter 404 is a median filter or low-pass filter which refers to the values, stored in the frame memory 201a, of a pixel of interest and its peripheral pixels (e.g., 3×3 or 5×5 pixels) in the current frame.

The time filtering process and spatial filtering process can be performed by thus referring to the frame stored in the frame memory 201a. Note that it is also possible to omit the spatial noise filter 404 and use the time noise filter 403 alone, or to omit the time noise filter 403 and use the spatial noise filter 404 alone.

The arrangement shown in FIG. 8 will be explained below. This arrangement shown in FIG. 8 adjusts the contribution by changing the weight of the filtering process in accordance with the correction coefficient g(x,y). More specifically, as shown in FIG. 8, a filtered image is weighted by h(G=g(x,y)) by a weighting unit 414, an unfiltered image is weighted by 1−h(G=g(x,y)) by a weighting unit 416, and the weighted mean of these images is calculated. This weight can be a simple linear value indicated by $$h(G) = g/g\max \quad (6)$$

where gmax is a maximum value which the correction coefficient g(x,y) can take

When the weight of equation (6) is used, a filtered image becomes dominant if the correction coefficient g(x,y) is large, and an unfiltered image becomes dominant if the correction coefficient g(x,y) is small. Note that it is also possible to change the strength of the filter in accordance with the correction coefficient g(x,y), instead of changing the weight in accordance with the correction coefficient g(x,y). That is, filtering is performed strongly if the correction coefficient g(x,y) is large, and performed weakly if it is small. The strength of the filter, e.g., a Gaussian filter, can be changed by multiplying a filter parameter by 1/p as a whole in accordance with the correction coefficient g(x,y). Note that as described previously, p (≧1.0) is a correction parameter for determining the strength of the correction amount.

As described above, a clear image in which noise is reduced can be obtained by performing the dodging process including the noise reduction process for an image having a large brightness difference in the camera 11 of the network camera system. As a consequence, the camera 11 having the same effect as the wide dynamic range camera can be obtained. Also, since noise reduction corresponding to the correction amount (the correction coefficient g(x,y) described above) is performed, a portion having many noise components and requiring noise elimination is preponderantly filtered. This avoids deterioration, caused by the noise reduction process, of the image quality of a portion requiring no noise elimination. It is, of course, also possible to achieve the effect of reducing the processing load on the camera 11 by filtering only a necessary portion in a frame. Furthermore, no noise elimination is performed during camera control in which noise is inconspicuous. This also makes it possible to reduce the processing load on the camera 11.

Second Embodiment

Image processing of the second embodiment according to the present invention will be described below. Note that the same reference numerals as in the first embodiment denote the same parts in the second embodiment, and a detailed explanation thereof will be omitted.

Although the camera 11 performs the dodging process in the first embodiment, terminals 12 and 13 perform the dodging process in the second embodiment.

Figure 9:
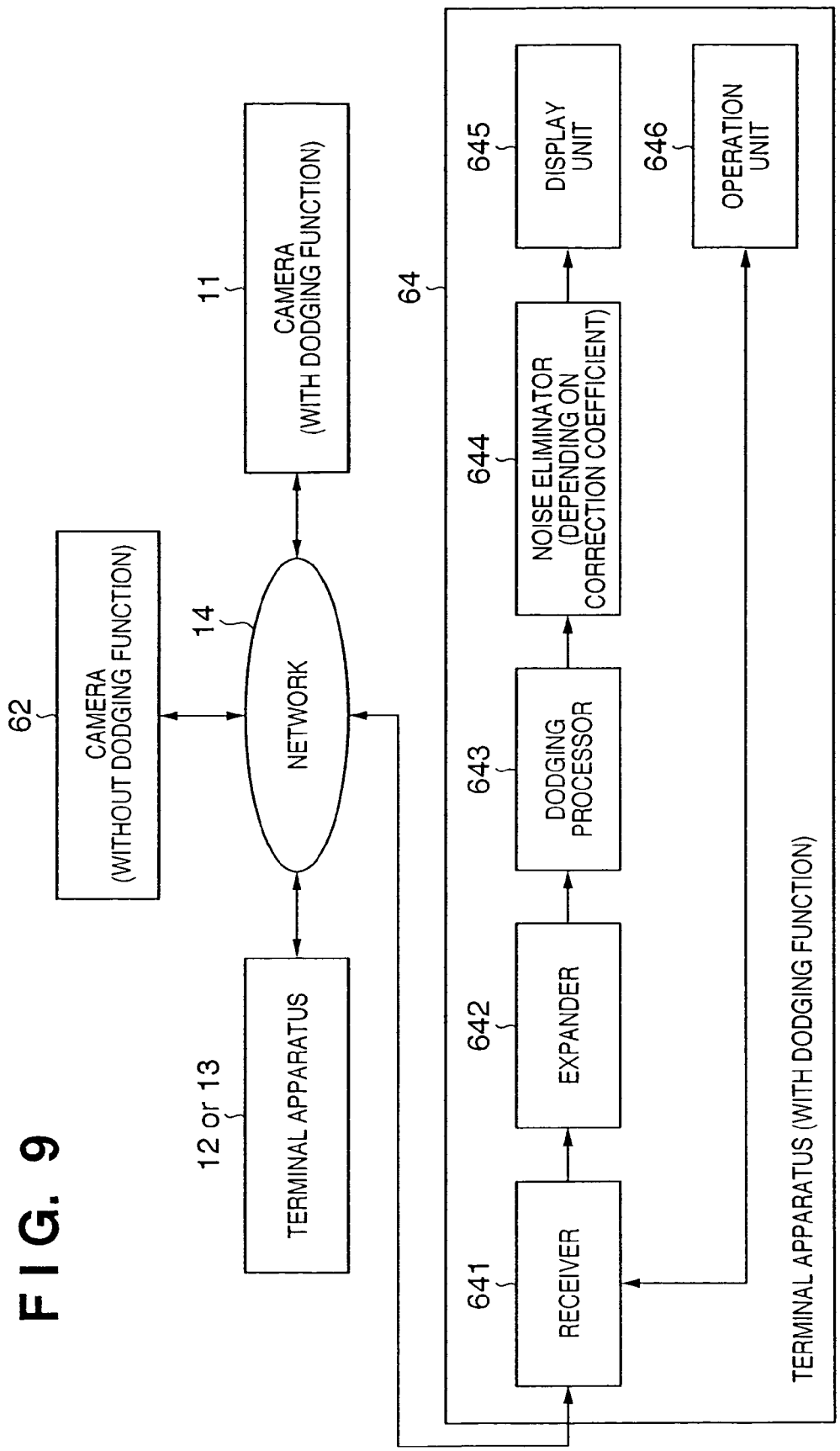
FIG. 9 is a block diagram showing the configuration of a network camera system of the second embodiment.

FIG. 9 is a block diagram showing the configuration of a network camera system of the second embodiment.

In addition to a camera 11 having a dodging function similar to that of the first embodiment, a camera 62 having no dodging function is connected to a network 14. Also, in addition to the terminal apparatus 12 (or 13) having no dodging function similar to that of the first embodiment, a terminal apparatus 64 having a dodging function is connected to the network 14. Note that in the terminal apparatus 64, the dodging function can be turned on and off by a user interface provided by an operation unit 646. It is also possible to automatically turn on the dodging function if a brightness difference of an image acquired by the terminal apparatus 64 is larger than a predetermined value.

Figure 10:
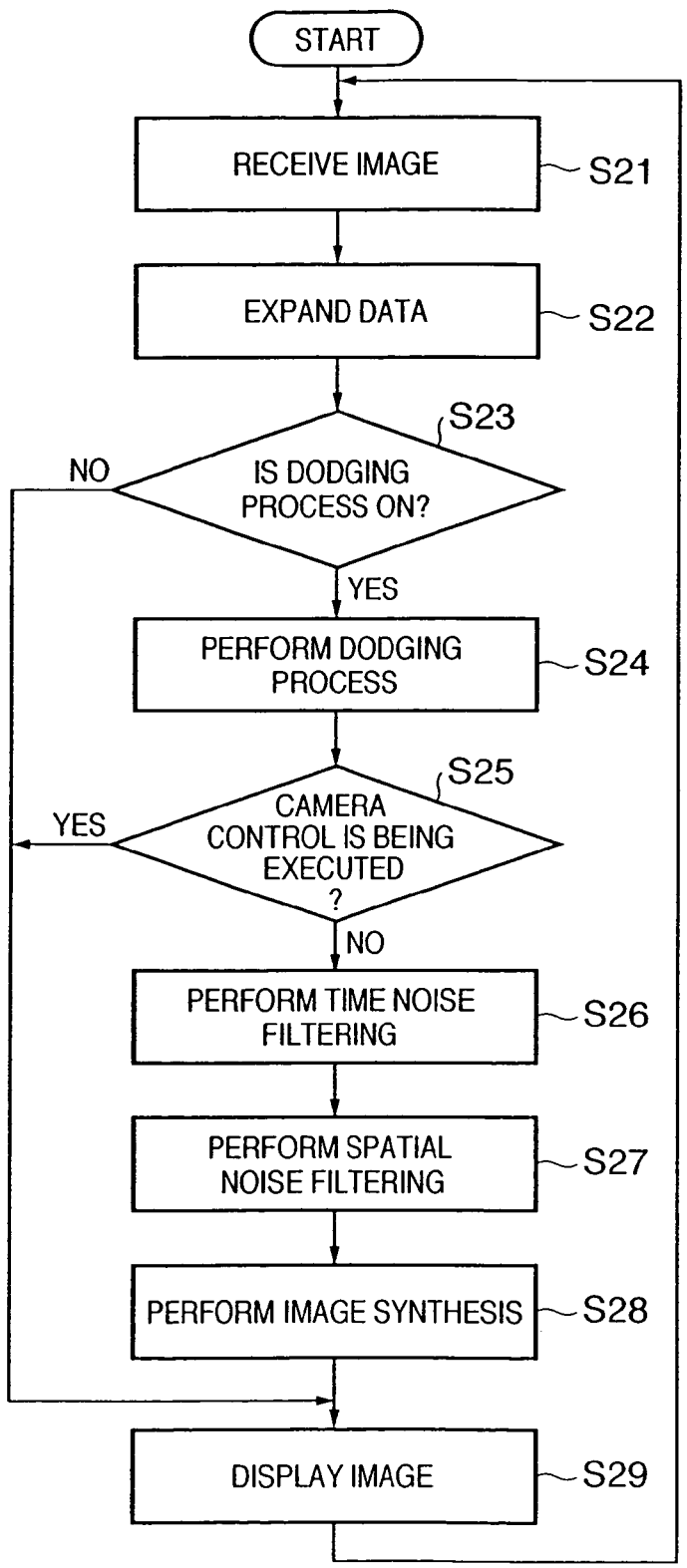
FIG. 10 is a flowchart showing processing when a terminal apparatus having a dodging function is connected to a camera having no dodging function.

FIG. 10 is a flowchart showing processing when the terminal apparatus 64 having a dodging function is connected to the camera 62 having no dodging function.

First, a receiver 641 receives an image from the camera 62 (S21). If the received image is compressed, an expander 642 expands the data (S22), and whether the dodging process is ON is determined (S23). If the dodging process is OFF, a dodging processor 643 and noise eliminator 644 are bypassed, and a display unit 645 displays the image on a monitor (S29).

If the dodging process is ON, the dodging processor 643 performs the dodging process described above (S24), and whether camera control is being executed is determined (S25). If no control is being executed, the noise eliminator 644 performs time noise filtering (S26) and spatial noise filtering (S27) described above. If the apparatus (the terminal apparatus 64) is performing camera control, if status information received together with the image from the camera 62 indicates that camera control is being executed, or if information indicating that camera control is being executed is superimposed on a frame, the noise eliminator 644 is bypassed, and the display unit 645 performs image synthesis (S28) described above, and displays the synthetic image on the monitor (S29).

Note that when the dodging process is to be performed, a correction parameter p which represents the strength of dodging and is set by the user interface described above is read out and processed in the same manner as the correction parameter p explained with reference to FIG. 4.

When the dodging process is made effective in the terminal apparatus 64 and an image having a high data compression ratio, e.g., an image compressed by JPEG or MPEG is processed, noise (to be referred to as "block noise" hereinafter) produced by block distortion occurring during compression is sometimes emphasized in a dark portion. Since block noise can be processed in the same manner as normal random noise, it is possible to perform filtering for reducing block noise in accordance with a correction coefficient g(x,y) in the same manner as random noise.

As another method of reducing block noise, when the terminal apparatus 64 having a dodging function is connected to the camera 11 having a dodging function, the dodging function of the camera 11 is given priority by turning off the dodging function of the terminal apparatus 64. To this end, before the processing shown in FIG. 10 is started, whether a camera as the connection destination has a dodging function is determined by the phase of connection negotiation. If the camera has a dodging function, the dodging processor 643 and noise eliminator 644 are bypassed regardless of ON/OFF of the dodging process.

As described above, the terminal apparatus 64 performs the dodging process for the camera 62 having no dodging function. Consequently, the image of the normal camera 62 can be observed on the terminal apparatus 64 as an image equal to the image of the wide dynamic range camera. That is, a clear image in which noise is reduced can be provided for a frame having a large brightness difference. In addition, if a camera as the connection destination has a dodging function, this dodging function of the camera is given priority to prevent block noise from becoming conspicuous.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

The present invention is not limited to the above embodiments and various changes and modifications can be made within the spirit and scope of the present invention. Therefore, to apprise the public of the scope of the present invention, the following claims are made.

CLAIM OF PRIORITY

This application claims priority from Japanese Patent Application No. 2004-249016 filed on Aug. 27, 2004, the entire contents of which are hereby incorporated by reference herein.

What is claimed is:

1. An image processing apparatus comprising:
an extractor, arranged to extract a luminance component of an image;
a generator, arranged to generate an unsharp image of the luminance component;
a corrector, arranged to correct the image using a correction amount in accordance with the unsharp image; and
an eliminator, arranged to eliminate noise of the corrected image in accordance with the correction amount,
wherein said eliminator makes the noise elimination effective when the correction amount exceeds a predetermined amount, and makes the noise elimination ineffective when the correction amount is not more than the predetermined amount.

2. The apparatus according to claim 1, wherein said generator generates the unsharp image by using luminance components of pixels surrounding a pixel of interest, said corrector calculates the correction amount of the pixel of interest referring to a pixel of the unsharp image which corresponds to the pixel of interest, and said eliminator controls elimination condition of the noise based on the correction amount.

3. The apparatus according to claim 1, wherein said eliminator is one of a median filter and low-pass filter.

4. The apparatus according to claim 1, further comprising a display controller arranged to display the image having undergone the noise elimination as an image on a monitor.

5. The apparatus according to claim 1, further comprising a camera arranged to photograph an image.

6. The apparatus according to claim 1, further comprising a camera controller arranged to control an angle of view of said extractor.

7. The apparatus according to claim 6, wherein said eliminator makes the noise elimination ineffective while the angle of view is controlled.

8. An image processing method comprising steps of:
extracting a luminance component of an image;
generating an unsharp image of the luminance component;
correcting the image using a correction amount in accordance with the unsharp image; and
eliminating noise of the corrected image in accordance with the correction amount, wherein the noise elimination is made effective when the correction amount exceeds a predetermined amount, and the noise elimination is made ineffective when the correction amount is not more than the predetermined amount.

9. The method according to claim 8, wherein the image is a frame image of a motion image, and the noise elimination is performed using a plurality of frame images including a frame image to be processed.

10. An image processing method comprising steps of:

performing correction based on a luminance component of an image;

performing a noise elimination process for the corrected image, wherein the noise elimination is made effective when a correction amount exceeds a predetermined amount and the noise elimination is made ineffective when the correction amount is not more than the predetermined amount; and controlling conditions of the correction and conditions of the noise elimination process on the basis of an unsharp image generated on the basis of the luminance component of the image.

11. The method according to claim 10, wherein the image is a frame image of a motion image, and the noise elimination process is performed using a plurality of frame images including a frame image to be processed.

12. A computer program stored on a computer-readable storage medium for an image processing method, said method comprising steps of:

extracting a luminance component of an image;

generating an unsharp image of the luminance component;

correcting the image using a correction amount in accordance with the unsharp image; and eliminating noise of the corrected image in accordance with the correction amount, wherein the noise elimination is made effective when the correction amount exceeds a predetermined amount, and the noise elimination is made ineffective when the correction amount is not more than the predetermined amount.

13. A computer program stored on a computer-readable storage medium for an image processing method, said method comprising steps of:

performing correction based on a luminance component of an image;

performing a noise elimination process for the corrected image, wherein the noise elimination is made effective when a correction amount exceeds a predetermined amount and the noise elimination is made ineffective when the correction amount is not more than the predetermined amount; and controlling conditions of the correction and conditions of the noise elimination process on the basis of an unsharp image generated on the basis of the luminance component of the image.

* * * * *